(12) United States Patent
Shin et al.

(10) Patent No.: US 11,335,340 B2
(45) Date of Patent: May 17, 2022

(54) HOME APPLIANCE OPERATING BASED ON ARTIFICIAL INTELLIGENCE AND VOICE RECOGNITION AND METHOD FOR CONTROLLING THEREOF

(71) Applicant: LG ELECTRONICS INC., Seoul (KR)

(72) Inventors: Hyosang Shin, Seoul (KR); Sungjun Yun, Seoul (KR); Yongwoon Jang, Seoul (KR); Byung Woo Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 424 days.

(21) Appl. No.: 16/521,520

(22) Filed: Jul. 24, 2019

(65) Prior Publication Data

US 2020/0051557 A1 Feb. 13, 2020

(30) Foreign Application Priority Data

Aug. 7, 2018 (KR) .................. 10-2018-0091972

(51) Int. Cl.
| | |
|---|---|
| *G10L 15/22* | (2006.01) |
| *D06F 33/00* | (2020.01) |
| *D06F 39/14* | (2006.01) |
| *G10L 15/26* | (2006.01) |
| *G10L 13/08* | (2013.01) |
| *D06F 105/50* | (2020.01) |
| *D06F 101/00* | (2020.01) |
| *D06F 33/47* | (2020.01) |

(52) U.S. Cl.
CPC .............. *G10L 15/22* (2013.01); *D06F 33/00* (2013.01); *D06F 39/14* (2013.01); *G10L 13/08* (2013.01); *G10L 15/26* (2013.01); *D06F 33/47* (2020.02); *D06F 2101/00* (2020.02); *D06F 2105/50* (2020.02); *G10L 2015/223* (2013.01)

(58) Field of Classification Search
None
See application file for complete search history.

(56) References Cited

U.S. PATENT DOCUMENTS

| | | | | |
|---|---|---|---|---|
| 4,520,576 A | * | 6/1985 | Vander Molen | ........ D06F 34/28 34/562 |
| 9,230,560 B2 | * | 1/2016 | Ehsani | ..................... G10L 15/22 |

(Continued)

*Primary Examiner* — Neeraj Sharma
(74) *Attorney, Agent, or Firm* — Lee Hong Degerman Kang & Waimey

(57) ABSTRACT

Provided is a home appliance that performs a washing or drying operation based on a start command input through artificial intelligence and voice recognition a method for controlling such a home appliance. According to the present disclosure, the home appliance and the method for controlling such a home appliance include a sensor that senses a state of a door installed in a washing unit and a controller that executes an operation command based on a change of a state of the door sensed by the sensor. At this time, when the door is changed from an open state to a close state after the power of the home appliance is turned on, the controller controls the operation of the washing unit based on the operation command extracted from the voice signal of the user. Thus, the present disclosure may enable performing an command to start an operation input based on voice recognition.

17 Claims, 7 Drawing Sheets

(56) References Cited

U.S. PATENT DOCUMENTS

| | | | | |
|---|---|---|---|---|
| 9,691,378 B1* | 6/2017 | Meyers | G10L 15/20 |
| 9,966,070 B2* | 5/2018 | Koetz | G06K 9/00288 |
| 10,268,814 B1* | 4/2019 | Barnes | G06F 3/0488 |
| 2008/0105001 A1* | 5/2008 | Jeong | D06F 34/32 |
| | | | | 68/3 R |
| 2014/0303783 A1* | 10/2014 | Ha | H04L 12/282 |
| | | | | 700/275 |
| 2014/0313047 A1* | 10/2014 | Kang | H04L 67/12 |
| | | | | 340/692 |
| 2016/0147207 A1* | 5/2016 | Park | G08C 17/00 |
| | | | | 700/275 |
| 2016/0258104 A1* | 9/2016 | James | D06F 34/32 |
| 2016/0289882 A1* | 10/2016 | Song | D06F 37/04 |
| 2020/0213700 A1* | 7/2020 | Kim | G06F 3/16 |
| 2021/0189625 A1* | 6/2021 | Xu | D06F 34/28 |

\* cited by examiner

151 : 151A, 151B
153 : 153A, 153B
180 : 180A, 180B

HOME APPLIANCE OPERATING BASED ON ARTIFICIAL INTELLIGENCE AND VOICE RECOGNITION AND METHOD FOR CONTROLLING THEREOF

CROSS-REFERENCE TO RELATED APPLICATION

Pursuant to 35 U.S.C. § 119(a), this application claims the benefit of earlier filing date and right of priority to Korean Application No. 10-2018-0091972, filed on Aug. 7, 2018, the contents of which are hereby incorporated by reference herein in their entirety.

BACKGROUND

1. Field of the Invention

A home appliance that executes a command to start operation input through artificial intelligence and voice recognition, and a method for controlling such a home appliance are disclosed herein.

2. Description of Related Art

Home appliances used in a predetermined space such as home or offices, and the like may perform their own functions and operations. Examples of a home appliance may include a washing machine, a dryer, an air conditioner, a robot cleaner, an air purifier, a refrigerator, an oven range, a water purifier, and the like.

Among them, the washing machine may include a drum or a tub that washes laundry, and a motor that rotates the drum or the tub. Likewise, the dryer may include a drum or a tub that dries the laundry and a motor that rotates the drum or the tub.

The drum or the tub provided in such a washing machine or a dryer may have a large inner space to accommodate a large amount of laundry. As a result, when children or pets enter the drum or the tub of the washing machine and are locked inside of the drum or the tub of the washing machine, there may be a problem that safety accidents may occur.

In order to prevent such a safety accident, there may be a constraint that a physical button may be pressed to start washing or drying of the washing machine or the dryer in the related art.

That is, with respect to the above-mentioned constraint, it is possible to prevent the safety accidents by operating the product only when a user identifies an inside of the drum or the tub before an operation to start the washing or the drying is performed. Therefore, even though the user instructs the washing machine or the dryer in the related art to start the washing or the drying through voice recognition, the product may not execute the command due to the above-mentioned constraint.

The above-mentioned constraint to prevent the safety accidents is preferable. However, as the constraint is applied, even when the user identifies the drum or the tub in advance, the command to start the operation through voice recognition may not be executed. Therefore, there may be a problem that the above-mentioned constraint causes inconvenience of user operation.

SUMMARY OF THE INVENTION

The present disclosure provides a home appliance that enables executing a command to start an operation input based on voice recognition when a user identifies a drum or a tub of a washing machine and a method for controlling such a home appliance.

The present disclosure provides a home appliance that may prevent safety accidents by executing a command to start an operation based on a change of a state of a door after a power of a product is turned on and a method for controlling such a home appliance.

The objects of the present disclosure are not limited to the above-mentioned objects, and other objects and advantages of the present disclosure which are not mentioned can be understood by the following description and more clearly understood by the implementations of the present disclosure. It will also be readily apparent that the objects and advantages of the present disclosure may be implemented by means appended in claims and a combination thereof.

According to the present disclosure, a home appliance and a method for controlling such a home appliance include a sensor that senses a state of a door installed in a washing unit and a controller that executes an operation command based on a change of the state of the door sensed by the sensor. At this time, when the door is changed from an open state to a close state after the power of the home appliance is turned on, the controller controls an operation of the washing unit based on the operation command extracted from a voice signal of the user. Thus, the present disclosure may enable executing a command to start an operation that is input based on voice recognition.

Further, according to the present disclosure, a home appliance and a method for controlling such a home appliance include a controller that executes an operation command based on a history of the door that stores a change of the state of a door after the power of the home appliance is turned on. At this time, when the door is changed from the open state to the close state after the power of the home appliance is turned on, the controller controls the operation of the washing unit based on the operation command extracted from the voice signal of the user. Accordingly, the present disclosure may enable preventing safety accidents by executing the command to start the operation only when the user opens and closes the door to identify an inside of the drum or the tub of the washing machine.

According to the present disclosure, the home appliance and the method for controlling such a home appliance may enable meeting an intent of the constraint of preventing the safety accidents by operating the product only when the user identifies the inside of the drum or the tub of the washing machine. The present disclosure may enable executing a command to start an operation that is input based on voice recognition. Accordingly, the present disclosure may eliminate inconvenience of pressing the button provided in the product to start the operation of the home appliance. Further, the user may control the home appliance to start the operation of the home appliance through voice and thereby user convenience with respect to using the home appliance may be improved.

Further, according to the present disclosure, the home appliance and the method for controlling such a home appliance execute a command to start an operation only when the door is changed from an open state to a close state after the power of the home appliance is turned on. Accordingly, a possibility that the safety accidents occur may be lowered. In addition, as stability and convenience of the home appliance are provided, a brand value of the home appliance may be improved.

The effects of the present disclosure are not limited to the effects described above, and those skilled in the art of the present disclosure can readily understand various effects obtained by the present disclosure based on the specific description of the disclosure.

DETAILED DESCRIPTION OF EXEMPLARY IMPLEMENTATIONS

Figure 1:
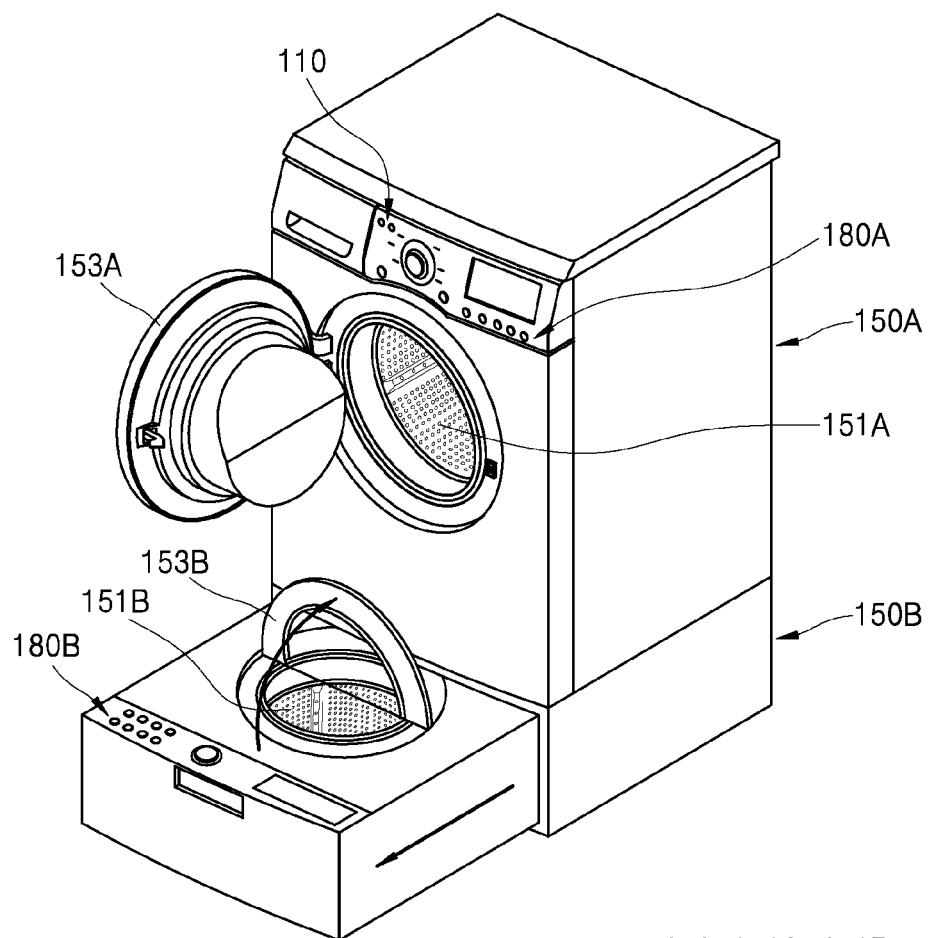
FIG. 1 is a perspective view of a home appliance according to an implementation of the present disclosure.

The advantages and features and a method for achieving them the present disclosure will become apparent with reference to the implementations described in detail below with reference to the accompanying drawings. The present disclosure may, however, be implemented in many different manners and should not be construed as being limited to the implementations set forth herein. Rather, these implementations are provided so that this disclosure will be thorough and complete, and will fully convey the scope of the disclosure to those skilled in the art to which the present disclosure pertains, and the disclosure is only defined by the scope of claims. Like reference numerals indicate like elements throughout the disclosure.

Unless defined otherwise, all terms (including technical and scientific terms) used herein may be used in a sense commonly understood by one of ordinary skill in the art to which the present disclosure belongs. Further, commonly used terms, which are defined in a dictionary, are not ideally or excessively interpreted unless explicitly and particularly defined otherwise.

Further, with respect to the implementation of the present disclosure, for convenience of explanation, the present disclosure may be described by subdividing components; however, these components may be implemented within one apparatus or module, or may be implemented by being divided into a plurality of apparatuses or modules.

Hereinafter, a home appliance and a method for controlling such a home appliance according to an implementation of the present disclosure will be described with reference to FIGS. 1 to 7.

FIG. 1 is a perspective view of a home appliance according to an implementation of the present disclosure. Examples of the home appliances may include washing machines, dryers, air conditioners, robot cleaners, air purifiers, refrigerators, oven ranges, water purifiers, and the like. For convenience of explanation, FIG. 1 shows an example of a washing machine.

However, the present disclosure is not limited to the washing machine, and the method for controlling the home appliance according to some implementations of the present disclosure may be applied to various types of home appliances that have an inner space in which children or pets may be locked therein.

Referring to FIG. 1, a home appliance 100 (that is, a washing machine) may include a plurality of washing units. Specifically, the home appliance 100 may include a first washing unit 150A and a second washing unit 150B.

The first washing unit 150A and the second washing unit 150B may be arranged adjacent to each other. For example, the first washing unit 150A and the second washing unit 150B may be arranged vertically.

At this time, the first washing unit 150A may be coupled to or may be separated from the second washing unit 150B. The first washing unit 150A and the second washing unit 150B may have respective housings. The respective housings may be coupled to and separated from each other.

In addition, the first washing unit 150A and the second washing unit 150B may be arranged in housing. In this case, the first washing unit 150A and the second washing unit 150B may be fixed into the housing and may not be separated from the housing.

The first washing unit 150A and the second washing unit 150B may be a front load type or a top load type washing machine.

The front load-type washing machine has a form in which laundry is inserted into an inside of the tub from a front surface thereof. Therefore, in the front load-type washing machine, the tub in which the laundry is processed rotates about a substantially horizontal axis.

On the other hand, the top load-type washing machine has a form in which the laundry is inserted into the inside of the tub. Therefore, in the top load-type washing machine, the tub in which the laundry is processed rotates about a substantially vertical axis.

FIG. 1 shows a front load-type first washing unit 150A and a top load-type second washing unit 150B. However, the present disclosure is not limited thereto, and the first washing unit 150A and the second washing unit 150B may be modified in various manners and may be implemented.

The first washing unit 150A may include a first tub 151A, a first door 153A, and a first interface 180A. The first door 153A is installed at an inlet of the first tub 151A. The first interface 180A includes various types of buttons that may control an operation of the first washing unit 150A.

Similarly, the second washing unit 150B may include a second tub 151B, a second door 153B, and a second interface 180B. The second door 153B is installed at an inlet of the second tub 151B. The second interface 180B has various types of buttons to control the operation of the second washing unit 150B.

That is, the first washing unit 150A and the second washing unit 150B may include washing tubs 151A and 151B, doors 153A and 153B, and interfaces 180A and 180B, respectively. Accordingly, the first washing unit 150A and the second washing unit 150B may operate independently of each other.

On the other hand, as children or pets have a small-sized body, the children or the pets may easily enter the first tub 151A or the second tub 151B of the washing machine. When the home appliance 100 is operated when the children or the pets enter the tubs 151A and 151B of the washing machine, the children or the pets may get seriously injured.

Accordingly, according to the present disclosure, the home appliance 100 may be controlled such that the operation of which starts only when the user identifies the inside of the tubs 151A and 151B of the washing machine so as to prevent the safety accidents that may occur when the children or the pets enter the respective tubs of the washing machine in advance.

For reference, the home appliance 100 may include only one washing unit 150, unlike the home appliance shown in the figures. In this case, the washing unit 150 may include a tub 151, a door 153, and an interface 180, respectively.

Hereinafter, for convenience of explanation, the home appliance 100 only includes a washing unit 150.

When the user directly presses a button provided on the interface 180 of the home appliance 100, there is a high probability that the user identifies the inside of the washing unit 150.

However, there is a possibility that the user may not identify the inside of the washing unit 150 of the home appliance 100 when the user issues a command to start the operation of the home appliance 100 through voice signal.

Accordingly, according to the present disclosure, the home appliance 100 may execute the command to start the operation based on the voice signal only when history of the door in which the user directly opens and closes the door 153 is present, thereby eliminating a potential risk that the user does not identify the inside of the washing unit 150.

That is, the command to start the operation based on the voice signal may be executed by the home appliance 100 only when it is determined that the user identifies the inside of the washing unit 150 through software logic.

Hereinafter, specific components of the home appliance 100 capable of executing a command to start the operation based on the voice signal will be described.

Figure 2:
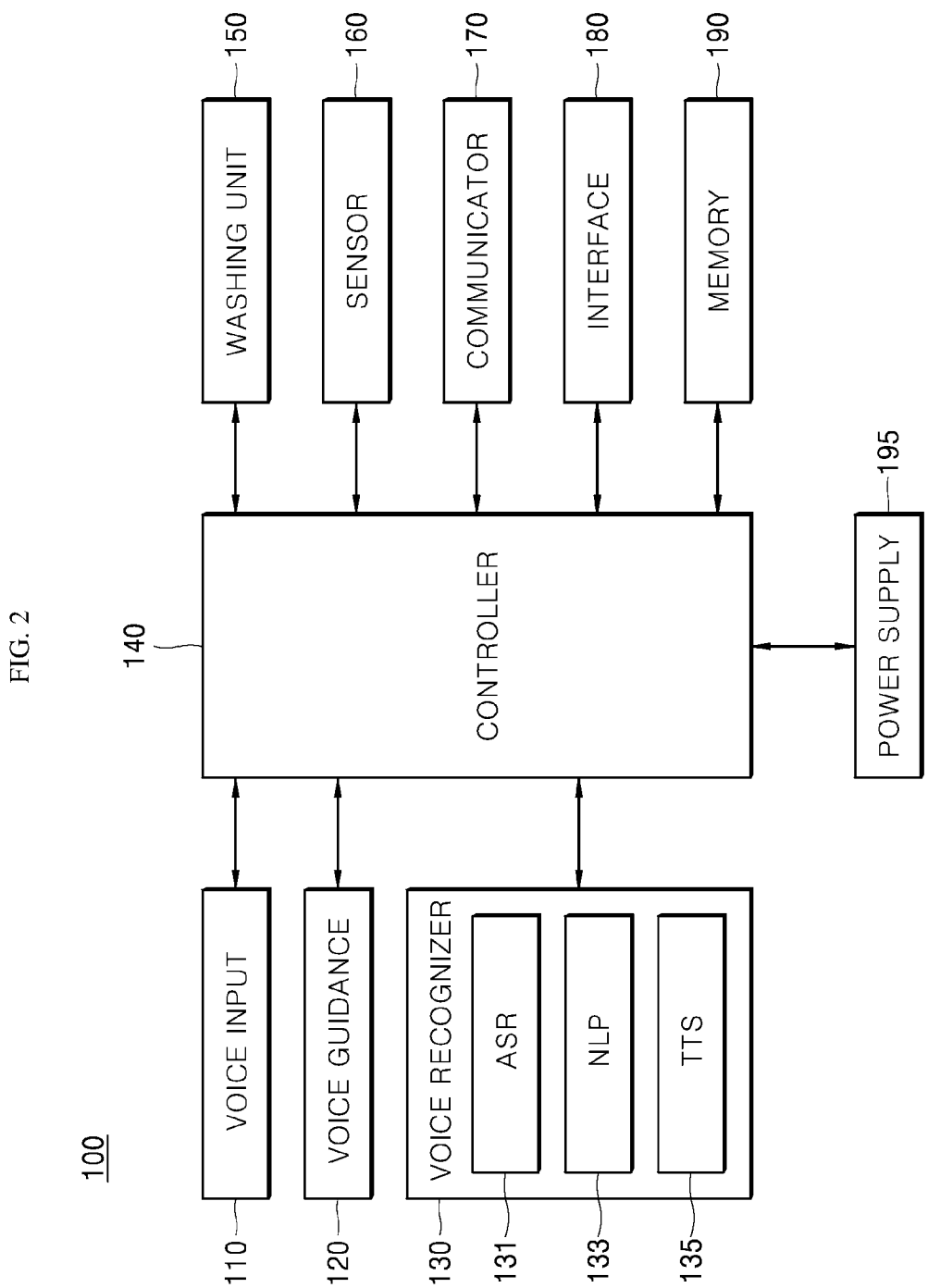
FIG. 2 is a block diagram of the home appliance of FIG. 1.

FIG. 2 is a block diagram of the home appliance of FIG. 1.

Referring to FIG. 2, according to an implementation of the present disclosure, a home appliance 100 includes a voice input 110, a voice guidance 120, a voice recognizer 130, a controller 140, a washing unit 150, a sensor 160, a communicator 170, an interface 180, a memory 190, and a power supply 195.

As shown in FIG. 2, the voice input 110, the voice guidance 120, the voice recognizer 130, the controller 140, the sensor 160, the communicator 170, the interface 180, the memory 190 may be implemented as a processor. Alternatively, some of these components may be implemented as a processor. Further, the processor may provide processing and memory functions.

The voice input 110 may receive a voice signal of the user. To this end, the voice input 110 may have one or more microphones (MIC).

For reference, in order to correctly receive the voice signal of the user, the voice input 110 may have a plurality of MICs. At this time, the plurality of MICs may be arranged at different positions from one another.

The voice input 110 may remove noise by comparing a large amount of data received from the plurality of MICs. The voice input 110 may use various kinds of noise removal algorithms to remove the noise generated during receiving of the voice signal of the user. Further, the voice input 110 may include components that process audio signal, for example, a filter that removes noise from an audio signal received at each MIC and am amplifier that amplifies the signal output from the filter and outputs the amplified signal. Accordingly, the voice input 110 may correctly receive the voice signal of the user.

The voice guidance 120 may convert voice data into voice and output the converted sound. The voice guidance 120 may have component (for example, a speaker, and the like) that converts an electric signal into sound. The voice guidance 120 may inform the user of information on a current state of the home appliance 100 and a notification message through voice.

The voice guidance 120 may receive and reproduce voice data from the TTS 135 described below.

The voice recognizer 130 receives data with respect to the voice signal of the user from the voice input 110. The voice recognizer 130 includes an automatic voice recognition 131 (ASR), a natural language processing or natural language understanding 133 (NLP), a text to voice 135 (TTS).

The ASR 131 converts the voice data received from the voice input 110 into text data. The ASR 131 may be variously expressed as natural language recognition or voice recognizer, and the like. The ASR 131 may use various types of techniques and algorithms to convert the voice data into the text data. The text data converted by the ASR 131 is transmitted to the NLP 133.

The NLP 133 may determine the voice signal by analyzing the previously stored natural language processing algorithm. The NLP 133 may process a natural language, which is a language that a person routinely uses according to a natural language processing algorithm, and may analyze intent of the user. That is, the NLP 133 may perform the natural language processing with respect to the text data received from the ASR 131 to determine an operation command that meets the intent of the user. The NLP 133 may be variously expressed as an intent analyzer, a NLP, or complex sentence recognizer, and the like. The NLP 133 may use various types of techniques and algorithms to determine the intent of the user.

Specifically, the NLP 133 analyzes the text data received from the ASR 131 and extracts a keyword for the operation command from the text data. For example, the extracted keyword may include an operation command indicating that the washing unit 150 starts operating.

The TTS 135 converts the text into voice data. The TTS 135 may be variously expressed as a voice synthesizer or a voice converter, and the like. The TTS 135 may use various types of techniques and algorithms to convert the text into the voice data.

The TTS 135 transmits the converted voice data to the voice guidance 120. At this time, the text received by the TTS 135 may include state information or a guidance message of the home appliance 100. The TTS 135 may receive the state information or the guidance message of the home appliance 100 from the NLP 133 or the controller 140.

The controller 140 may perform overall control of components the home appliance includes.

The controller 140 may control the operation of the washing unit 150 with reference to a change of a state of the door 153 the washing unit 150 includes after the power of the home appliance 100 is turned on. Information on the change of the state of the door 153 may be stored in the memory 190 described below.

The controller 140 determines whether the door 153 is changed from the open state to the close state after the power of the home appliance 100 is turned on with reference to the memory 190.

If the door 153 is changed from the open state to the close state after the power of the home appliance 100 is turned on, the controller 140 may control the operation of the washing unit 150 based on the operation command received from the voice recognizer 130.

On the other hand, when the door 153 maintains a close state after the power of the home appliance 100 is turned on, the controller 140 does not execute an operation command received from the voice recognizer 130. The controller 140 may generate a guidance message requesting the identification of the washing unit 150 and may transmit the generated guidance message to the voice recognizer 130 (i.e., the TTS 135).

For example, the guidance message may include contents of "Please identify the inside of the tub". However, this is only one example, and the guidance message may be changed in various manners and implemented.

On the other hand, after the guidance message is output from the voice guidance 120, the door 153 may be switched from the open state to the close state by the user. At this time, the controller 140 may control the operation of the washing unit 150 based on the operation command received from the voice recognizer 130.

In addition, the controller 140 may provide the user with predetermined information through visual or auditory means in each step of recognizing the voice and controlling the washing machine.

For example, the controller 140 may display visual information on the process of recognizing the voice and the process of controlling the washing machine on the interface 180. In addition, the controller 140 may provide auditory information obtained during recognition of the voice and the controlling of the home appliance through the voice guidance 120.

The washing unit 150 includes a tub 151 that may receive laundry and a motor (not shown) that rotates the tub 151. The door 153 that opens and closes the inlet of the tub 151 may be installed in the tub 150.

The sensor 160 may sense the state of the door 153 installed in the washing unit 150. The sensor 160 may sense whether the door 153 installed in the washing unit 150 is in an open state or a close state.

The sensor 160 may operate only when the power of the home appliance 100 is turned on. Information on the result sensed by the sensor 160 may be transmitted to the controller 140. The controller 140 may store the state information of the door 153 received from the sensor 160 in the memory 190.

The communicator 170 has one or more communication modules. Accordingly, the communicator 170 may perform wireless communication with other electronic devices and exchange various types of signals. For example, the communicator 170 may exchange data with separate servers using a wireless Internet network.

The interface 180 may include a plurality of operation buttons and a display. The user may set a washing course or an additional washing option using a plurality of operation buttons. The display may display information on a command input by a user, a processing result in response to a command input by the user, an operation course, an operation state, an error state, and the like, of the washing machine. In addition, the interface 180 may have a touch pad and a touch screen, which are coupled to each other.

The memory 190 records various kinds of information necessary for the operation of the washing machine, and may include a volatile or nonvolatile recording medium. In the memory 190, data for voice recognition may be stored in a database form.

The memory 190 may store data with respect to the change of the state of the door 153 sensed by the sensor 160 after the power of the home appliance 100 is turned on. At this time, the data received from the sensor 160 may be stored in the volatile memory. Accordingly, when the power of the home appliance 100 is turned off, data received from the sensor 160 may be deleted.

The power supply 195 may supply all components the home appliance 100 includes with the power. However, the controller 140 may turn on or off the power of the home appliance 100 under specific conditions. Accordingly, when the power of the home appliance 100 is turned off, the power supply 195 may provide the controller 140 with minimum power to turn on the power of the home appliance 100.

In addition, the controller 140 of the home appliance 100 may perform the machine learning based on the received voice data. The memory 190 may store data used for the machine learning, result data, and the like.

In more detail, technology of deep learning, which is a kind of machine learning, denotes learning with a deep level, in multi steps, based on the data.

The deep learning may represent a set of machine learning algorithms that may be used to extract key data from a large amount of data as it goes higher step.

A structure of the deep learning may include an artificial neural network (ANN). For example, the structure of the deep learning may include a deep neural network (DNN) such as a convolutional neural network (CNN), a recurrent neural network (RNN), and deep belief network (DBN).

The controller 140 may use various types of known structures of deep learning. For example, the controller 140 may use a structure such as the convolutional neural network (CNN), the recurrent neural network (RNN), and the deep belief network (DBN).

Specifically, the convolutional neural network (CNN) is a model that simulates a function of brain of a person made based on an assumption that extracts basic features of an object, when a person recognizes an object, and computes complex functions in the brain and recognizes the object based on the result thereof.

Recurrent neural network (RNN) is widely used for natural language processing, and the like, and may have a structure that is effective for processing time-series data that is changed over time and may have a structure of the ANN by stacking layers every time.

The deep belief network (DBN) has a structure of deep learning that is made by stacking restricted boltzman machine (RBM) which is a deep learning technique. When the learning of restricted boltzman machine (RBM) is repeated and the predetermined numbers of layers are formed, deep belief network (DBN) that has the corresponding number of layers may be provided.

Meanwhile, the learning of the ANN of the controller 140 may be performed by adjusting the weight of an inter-node connection line (adjusting a bias value as necessary) so that a desired output is obtained for a given input.

Further, the ANN may continuously update a weight value by learning. Back propagation, and the like may be used to perform the learning based on the ANN.

Meanwhile, the memory 190 may have an artificial neural network previously learned by machine learning.

That is, according to an implementation of the present disclosure, the home appliance 100 may perform the machine learning-based voice recognition using received voice data as input data. At this time, both unsupervised learning and supervised learning may be used as a method of machine learning based on the ANN. In addition, the controller 140 may control to update the structure of the ANN through the voice recognition, after learning, according to the setting.

In another implementation of the present disclosure, the voice recognizer 130 and the controller 140 may be implemented as separate external servers. Hereinafter, the voice recognition server system 200 including the voice recognition server 230 that performs the operation of the voice recognizer 130 and the control server 240 that performs the operation of the controller 140 will be described with reference to FIGS. 3 and 4.

Figure 3:
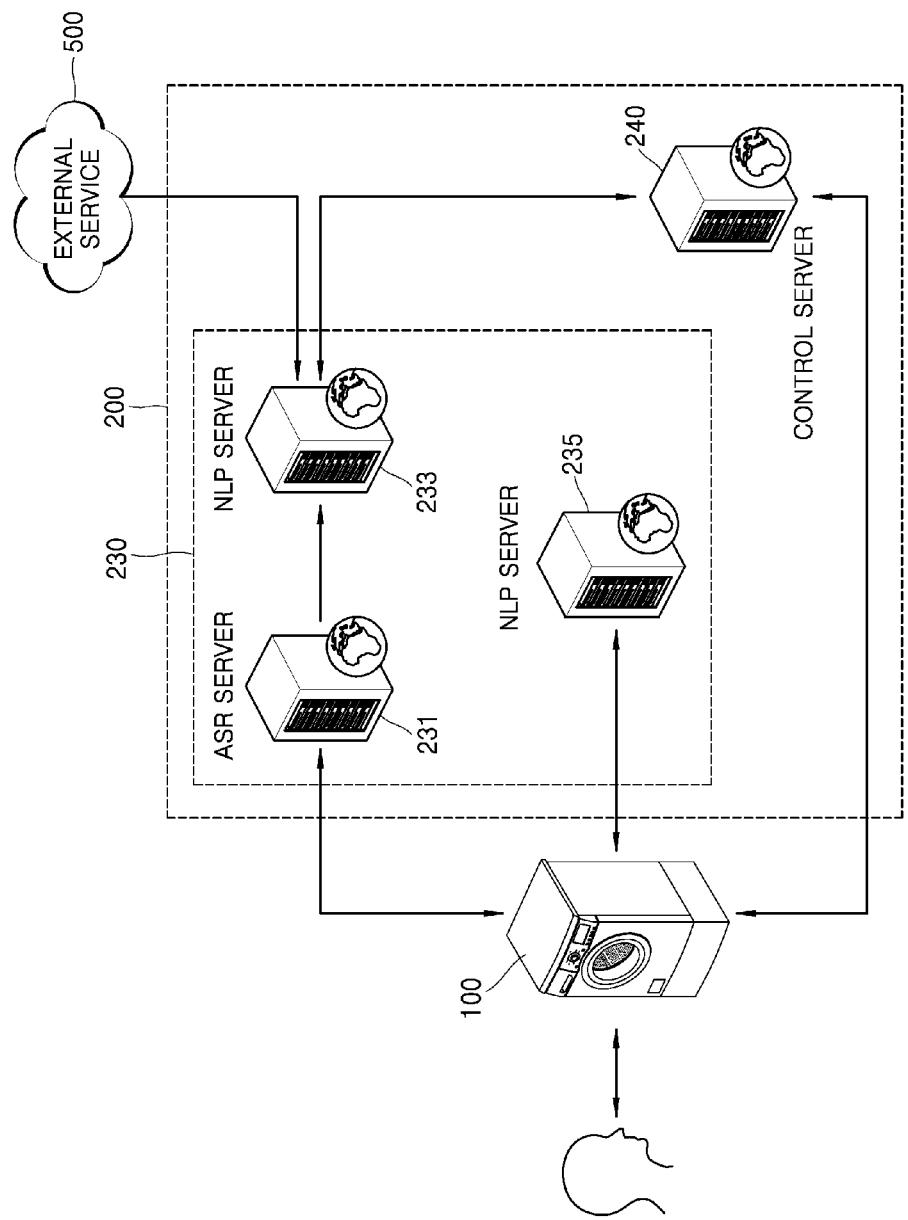
FIG. 3 shows a voice recognition server system in communication with a home appliance according to another implementation of the present disclosure.
Figure 4:
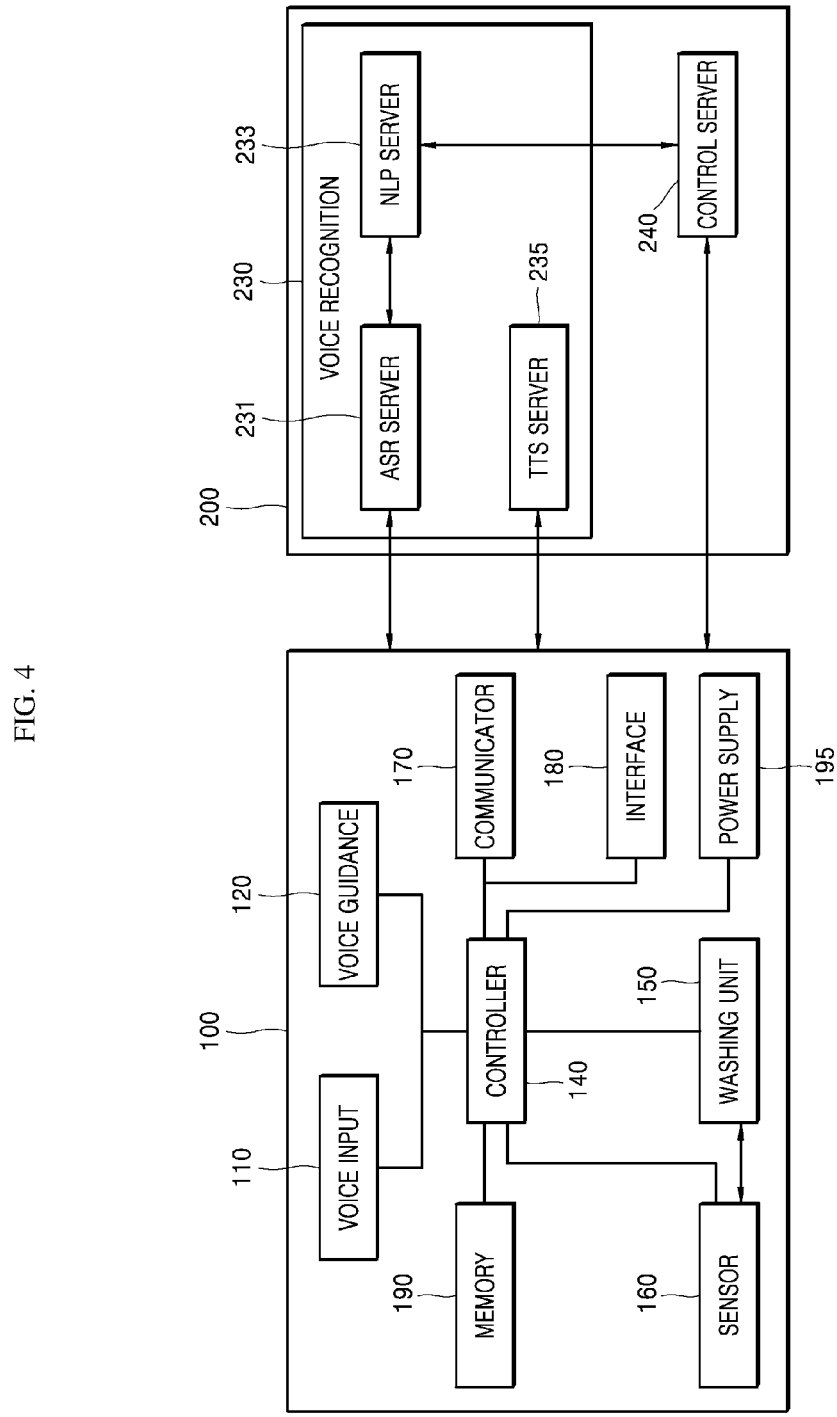
FIG. 4 is a block diagram of a relation between the home appliance and the voice recognition server system of FIG. 3.

FIG. 3 shows a voice recognition server system in communication with a home appliance according to another implementation of the present disclosure. FIG. 4 is a block diagram of relation between the home appliances and the voice recognition server system of FIG. 3.

Referring to FIGS. 3 and 4, according to another implementation of the present disclosure, a home appliance 100 includes a voice input 110, a voice guidance 120, a controller 140, a washing unit 150, a sensor 160, a communicator 170, an interface 180, a memory 190, and a power supply 195.

Each component the home appliance 100 includes according to another implementation of the present disclosure may be operated substantially the same as each component the home appliance 100 includes according to the implementation of the present disclosure described with reference to FIG. 2. Hereinafter, the contents overlapping with those described with reference to FIG. 2 will be omitted and differences will be mainly described.

The voice recognition server system 200 exchanges data with the home appliance 100 through a wireless communication network. In addition, the voice recognition server system 200 may control the operation of the home appliance 100.

The voice recognition server system 200 includes a voice recognition server 230 and a control server 240.

The voice recognition server 230 may include an ASR server 231, an NLP server 233, and a TTS server 235. The voice recognition server 230 may operate substantially the same as the voice recognizer 130 the home appliance 100 includes according to the implementation described above.

Specifically, the ASR server 231 receives the voice data generated by the voice input 110 through the communicator 170. The ASR server 231 converts the received voice data into text data. The ASR server 231 may be variously expressed as a natural language recognition server or a voice recognition server, and the like. The ASR server 231 may use various types of techniques and algorithms to convert voice data into text data. The converted text data is transmitted to the NLP server 233.

The NLP server 233 may process a natural language that is a language that a person routinely uses according to a natural language processing algorithm and may analyze the intent of the user. That is, the NLP server 233 may perform the natural language processing with respect to the text data received from the ASR server 231 to determine an operation command that meets the intent of the user. At this time, the NLP server 233 may be variously expressed as an intent analysis server, a natural language processing server, or a complex sentence recognition server, and the like. The NLP server 233 may use various types of techniques and algorithms to determine the intent of the user.

At this time, the NLP server 233 analyzes the text data received from the ASR server 231 and extracts a keyword for the operation command from the received text data. For example, the extracted keyword may include an operation command indicating that the washing unit 150 starts operating.

Subsequently, the NLP server 233 transmits the operation command to the control server 240.

In addition, the NLP server 233 may communicate with an external service server 500. For example, when the voice command of the user enables requesting information on weather, stock, news, and the like, the NLP server 233 may request the server that provides the service for the related information. The information received from the external service server 500 to the NLP server 233 may be transmitted to the home appliance 100 or the control server 240.

The TTS server 235 converts the text into voice data. The TTS server 235 may be variously expressed as a voice synthesis server or a voice conversion server, and the like. The TTS server 235 may use various types of techniques and algorithms to convert text into voice data. The TTS 135 transmits the converted voice data to the voice guidance 120 of the home appliance 100 through the communicator 170. At this time, the text received by the TTS server 235 may include the state information or the guidance message of the home appliance 100 described above.

The control server 240 may control the operation of the home appliance 100 based on the operation command received from the NLP server 233.

The control server 240 may control the operation of the washing unit 150 with reference to the change of the state of the door 153 the washing unit 150 includes after the power of the home appliance 100 is turned on. At this time, the control server 240 may receive and use information on the change of the state of the door 153 stored in the memory 190 of the home appliance 100.

Specifically, the control server 240 may determine whether the door 153 is changed from an open state to a close state after the power of the home appliance 100 is turned on with reference to the memory 190 of the home appliance 100.

When the door 153 is changed from the open state to the close state after the power of the home appliance 100 is turned on, the controller 140 may control the operation of the washing unit 150 based on the operation command received from the NLP server 233.

On the other hand, when the door 153 maintains the close state after the power of the home appliance 100 is turned on, the control server 240 does not execute the operation command received from the voice recognizer 130.

Then, the control server 240 may generate a guidance message that requests identification with respect to the washing unit 150, and may transmit the generated guidance message to the home appliance 100. For example, the guidance message may include contents of "please identify the inside of the tub".

Subsequently, after the guidance message is output from the voice guidance 120, the door 153 may be switched from the open state to the close state by the user. At this time, the control server 240 may control the operation of the washing unit 150 based on the operation command received from the NLP server 233.

For reference, the voice recognition server 230 may perform the machine learning with respect to received voice data. The algorithms and data used for machine learning may be stored in each server and may be used. As the description of the machine learning has been described above, a detailed description thereof will be omitted.

Meanwhile, unlike the home appliance 100 according to the implementation of the present disclosure, the controller 140 of the home appliance 100 according to another implementation of the present disclosure may only perform the overall control operation of the components the home appliance 100 includes.

For example, the controller 140 may control the operation of each component of the home appliance 100 based on the control signal received from the control server 240. Further, the controller 140 may transmit the voice data received from the voice input 110 to the ASR server 231 through the communicator 170. In addition, the controller 140 may transmit the guidance message received from the communicator 170 to the voice guidance 120. In addition, the controller 140 may notify the user of the operation state of the home appliance 100 through the interface 180.

In summary, as described above with reference to FIG. 2, the above-described voice recognition and control operations of the home appliance of the present disclosure may be performed by the home appliance 100.

Meanwhile, referring to FIGS. 3 and 4, all or some of the above-mentioned voice recognition and control operations of the home appliance of the present disclosure may be performed by a separate server (that is, the voice recognition server 230 or the control server 240). However, the voice recognition and the method for controlling of the home appliance performed in each implementation may be substantially the same.

Hereinafter, for convenience of explanation, a method for controlling of the home appliance 100 according to some implementations of the present disclosure will be described with reference to the implementation shown in FIG. 2.

However, the method for controlling the home appliance 100 may be performed substantially in the same manner by the voice recognition server 230 and the control server 240.

Figure 5:
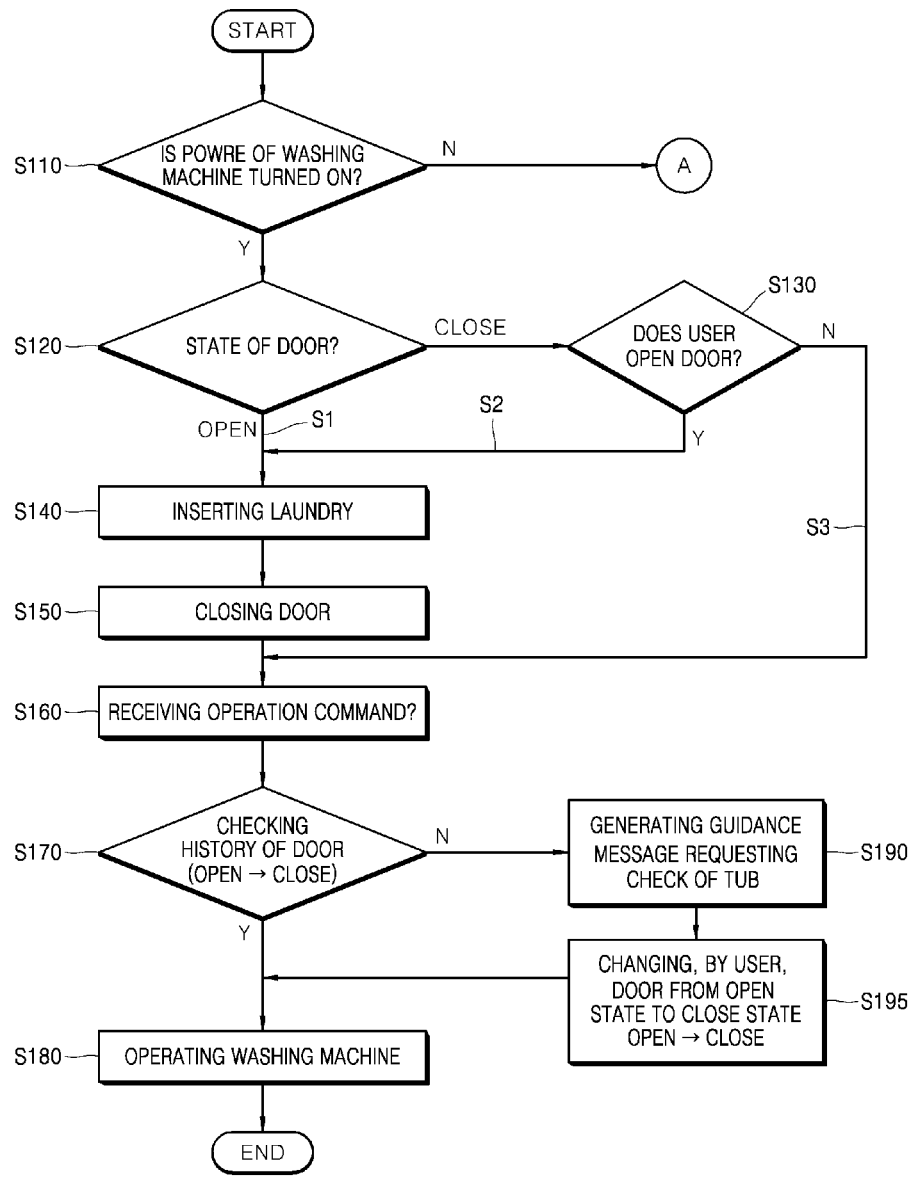
FIG. 5 is a flowchart of a method for controlling a home appliance according to an implementation of the present disclosure.

FIG. 5 is a flowchart of a method for controlling a home appliance according to an implementation of the present disclosure.

Referring to FIG. 5, in a method for controlling a home appliance according to an implementation of the present disclosure, the controller 140 determines whether a power of the home appliance 100 (for example, a washing machine) is turned on (S110).

When the power of the home appliance 100 is turned on, the controller 140 identifies a current state of the door 153 installed in the washing unit 150 (S120). The controller 140 may identify a current state of the door 153 using the sensor 160.

If the current state of the door 153 is in the open state, the user inserts the laundry into the washing unit 150 (S140). A case in which the current state of the door 153 is in the open state is defined as 'Scenario 1 (S1)'.

In Scenario 1 (S1), the user finishes the insertion of the laundry into the tub 150 and closes the door 153 (S150). At this time, the door 153 is switched to a close state, and the sensor 160 senses the close state of the door and transmits information on the close state of the door to the controller 140.

Then, the controller 140 receives an operation command from the user through voice (S160). At this time, the user may utter voice to start the operation of the home appliance 100. The voice recognizer 130 may receive and analyze the voice signal of the user and extract an operation command from the voice signal of the user. The operation command extracted by the voice recognizer 130 may be transmitted to the controller 140.

Then, the controller 140 checks history of the door after the power of the home appliance 100 is turned on (S170). The history of door indicates a change of the state of the door 153 after the power of home appliance 100 is turned on. Information on the history of door may be stored in the memory 190 and may be used.

If the state of the door 153 is changed from the open state to the close state after the power of the home appliance 100 is turned on, the controller 140 controls the operation of the washing unit 150 based on the operation command received from the voice recognizer (S180).

At this time, the controller 140 refers to the history of door stored in the memory 190 to determine whether the door 153 is changed from the open state to the close state after the power of the home appliance 100 is turned on.

Scenario 1 (S1) corresponds to a case in which the state of the door 153 is changed from the open state to the close state after the power of the home appliance 100 is turned on. Accordingly, in Scenario 1 (S1), as there is a high probability that the user may identify the inside of the tub 150 during insertion the laundry into the tub 150, the controller 140 may execute the operation command through the voice of the user.

Meanwhile, if the current state of the door 153 is a close state in S120, the controller 140 senses whether the user opened the door 153 thereafter (S130). The controller 140 may sense the state of the door 153 through the sensor 160.

A case in which the current state of the door 153 is the close state and the user switches the door 153 to the open state is defined as 'Scenario 2 (S2)'. A case in which the current state of the door 153 is in a close state and the user maintains the door 153 to be in a close state is defined as 'Scenario 3 (S3)'. Hereinafter, Scenario 2 (S2) and Scenario 3 (S3) will be described.

In the case of Scenario 2 (S2), the above-described S140 to S170 are repeated.

In the case of Scenario 2 (S2), in S170, the controller 140 may determine that the state of the door 153 is changed from the open state to the close state after the power of the home appliance 100 is turned on.

Accordingly, the controller 140 performs the above-described S180. That is, the controller 140 may control the operation of the washing unit 150 based on the operation command received from the voice recognizer 130.

On the other hand, in the case of Scenario 3 (S3), the state of the door 153 is not changed. That is, the door 153 maintains the close state continuously. Then, the controller 140 receives an operation command from the user through voice (S160).

Then, the controller 140 checks the history of door after the power of the home appliance 100 is turned on (S170). At this time, the door 153 maintains the close state continuously after the power of the home appliance 100 is turned on.

In this case, the controller 140 generates a guidance message to request identification of the washing unit 150 (S190) because the user does not identify the inside of the washing unit 150 and there is a risk of a safety accidents. In this case, the controller 140 may not operate the washing unit 150 based on the operation command.

Then, the controller 140 may transmit the generated guidance message to the TTS 135. The guidance message converted into the voice data by the TTS 135 may be output from the voice guidance 120 through sound.

For example, the guidance message may include contents of "Please identify the inside of the tub". However, this is only one example, and the guidance message may be modified in various ways may be implemented.

Then, after the guidance message is output from the voice guidance 120, the door 153 may be opened and closed by the user (S195). This indicates that the user who recognized the guidance message identified the inside of the washing unit 150. In this case, as the user identifies the inside of the washing unit 150, a possibility of occurrence of the safety accidents is lowered.

Accordingly, the controller 140 may control the operation of the washing unit 150 based on the operation command received from the voice recognizer 130 (S180).

In summary, in the method for controlling of the home appliance according to the implementation of the present disclosure, only when the probability of occurrence of safety accidents during the operation of the home appliance 100 is low, the controller 140 may operate the washing unit 150 based on the voice command of the user.

Accordingly, the user may control the home appliance to start the operation thereof through voice. The present disclosure may enable eliminating inconvenience of pressing the button to start the operation provided in the product in order to start the operation of the home appliance. Further, reliability of the home appliance with respect to the safety may be improved.

Figure 6:
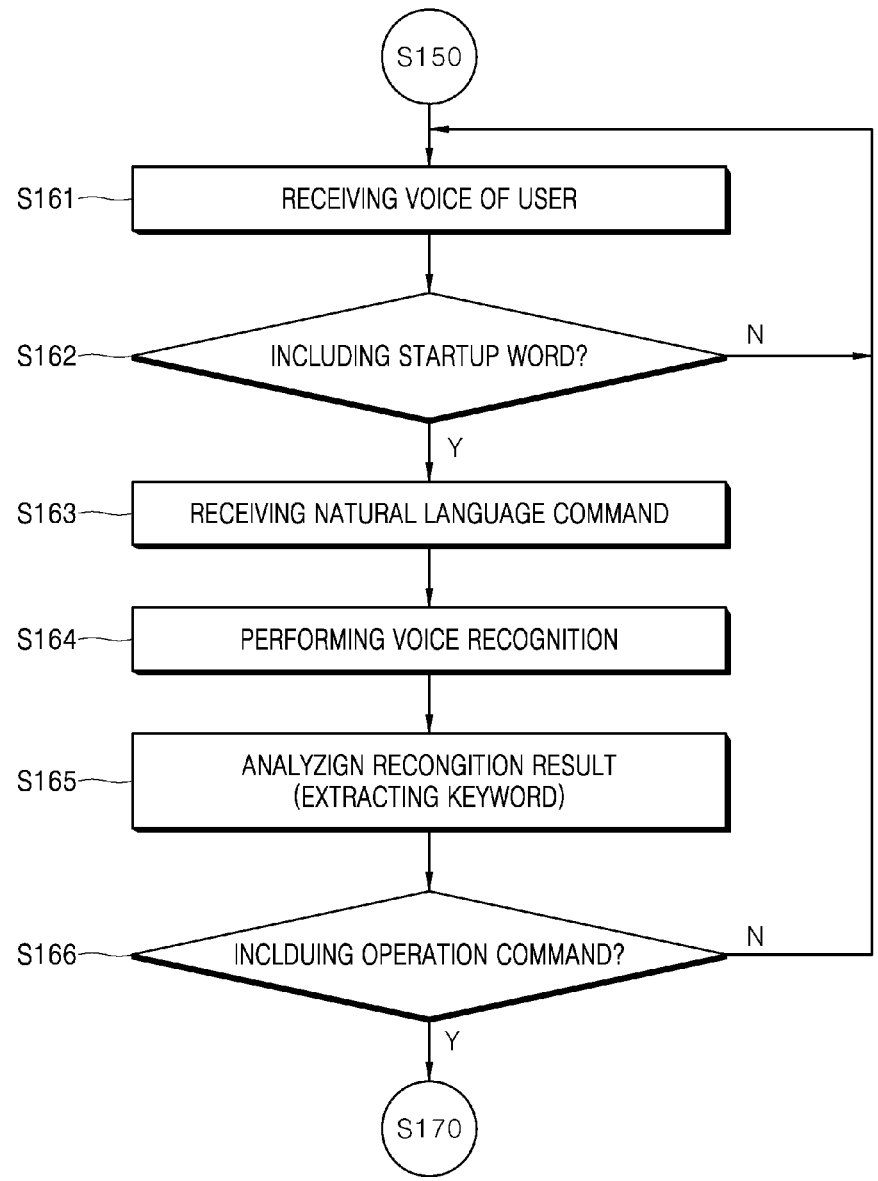
FIG. 6 is a flowchart of receiving an operation command of the user in S160 of FIG. 5.

Hereinafter, an implementation in S160 of extracting an operation command based on the voice signal of the user will be described in detail FIG. 6 is a flowchart of receiving an operation command of a user in S160 of FIG. 5. Referring to FIG. 6, in above-mentioned S160, the home appliance 100 receives a voice of the user (S161). The home appliance 100 receives voice data of the user through a voice input 110. The input voice data may be transmitted to the voice recognizer 130.

Then, the voice recognizer 130 determines whether the input voice data includes a startup word (S162).

The startup word may be set by a manufacturer. For example, the startup word of the home appliance 100 may be "Hi LG" or "LG tromm", and the like. At this time, the startup words may be modified in various ways and set.

Then, if the input voice data includes the startup word, the home appliance 100 may receive a natural language command from the user through the voice input 110 (S163).

Then, when the natural language command is received, the ASR 131 performs an operation of voice recognition based on the received voice data (S164). The ASR 131 converts the received voice data into text data. The converted text data is transmitted to the NLP 133.

Then, the NLP 133 analyzes the result of the operation of the voice recognition performed by the ASR 131 (S165). That is, the NLP 133 extracts a keyword for the voice command from the received text data. For example, the extracted keyword may include an operation command indicating that the washing unit 150 starts operating.

If the extracted keyword includes an operation command, the NLP 133 transmits an operation command to the controller 140 (S166).

Then, the controller 140 determines whether the operation command is executed based on the history of the door after the power of the home appliance 100 is turned on (S170).

As the description of S170 has been described above in detail, the repetitive description will be omitted here.

Hereinafter, the method for controlling of the home appliance when the power of the home appliance 100 is turned off in S110 of FIG. 5 will be described in detail.

Figure 7:
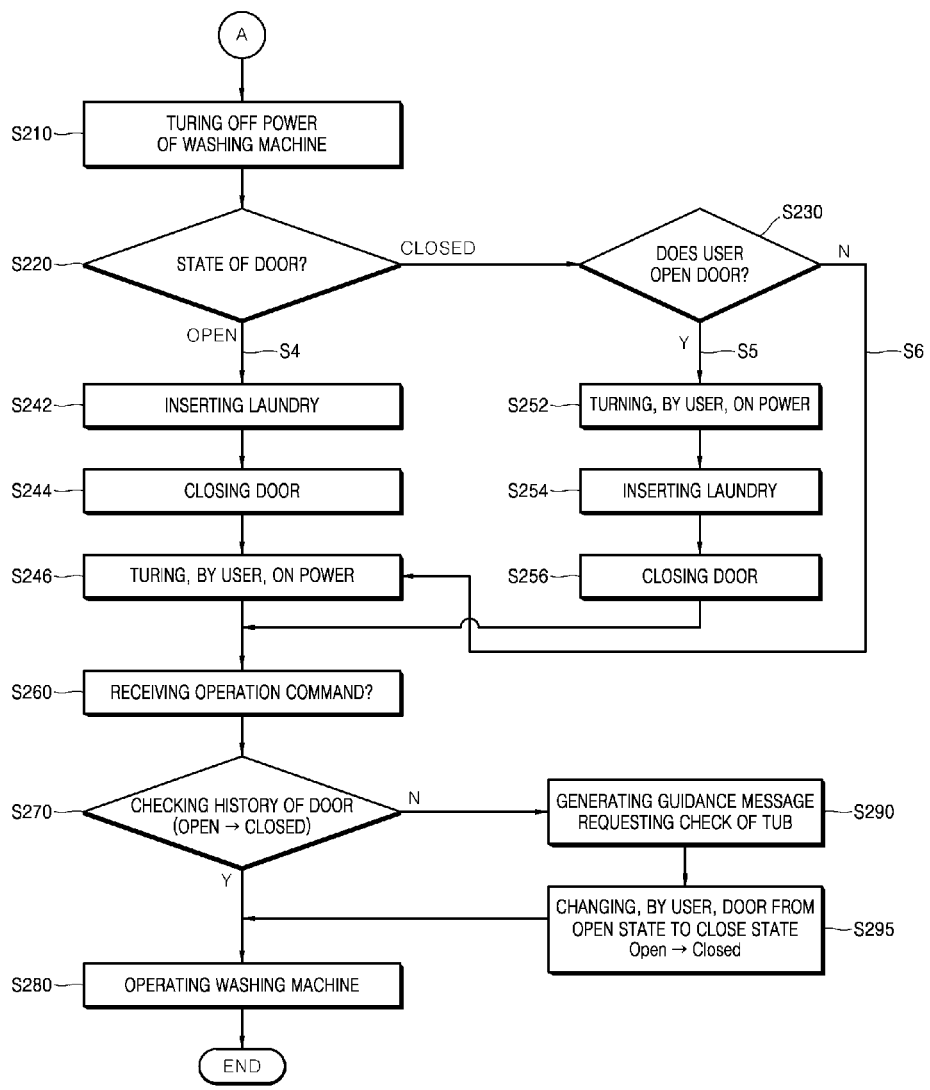
FIG. 7 is a flowchart of a method for controlling a home appliance according to another implementation of the present disclosure.

FIG. 7 is a flowchart of a method for controlling a home appliance according to another implementation of the present disclosure.

Referring to FIG. 7, in S110 of FIG. 5, when the power of the home appliance 100 is turned off, the controller 140 determines the current state of the door 153 (S210 and S220). At this time, the controller 140 may determine the current state of the door 153 using the sensor 160.

For reference, a power supply 195 may continuously supply a minimum power to operate the controller 140 even when the power of the home appliance 100 is turned off. At this time, the power provided to the controller 140 may be used for the operation of the sensor 160. However, the controller 140 may operate the sensor 160 by providing the sensor 160 with the power only at a specific moment.

If the current state of the door 153 is in the open state, the user inserts the laundry into the washing unit 150 (S242). A case in which the current state of the door 153 is the open state is defined as 'Scenario 4 (S4)'.

In the case of Scenario 4 (S4), the user finishes inserting the laundry into the washing unit and closes the door 153 (S244). At this time, the door 153 is switched to the close state. However, as the power of the home appliance 100 is turned off, the sensor 160 may not sense changes of the state of the door 153. Alternatively, the data sensed by the sensor 160 may not be stored in the history of door of the memory 190.

Then, the user turns on the power of the home appliance 100 (S246) to operate the home appliance 100.

Then, the controller 140 receives an operation command from the user through voice (S260). At this time, the user may utter a voice signal to start the operation of the home appliance 100. The voice recognizer 130 may receive and analyze the voice signal of the user and extract an operation command. The operation command extracted by the voice recognizer 130 may be transmitted to the controller 140.

Then, the controller 140 checks the history of door after the power of the home appliance 100 is turned on (S170). The history of the door indicates a change of the state of the door 153 after the power of the home appliance 100 is turned on. The history of the door may be stored in the memory 190 and may be used.

If the state of the door 153 is changed from the open state to the close state after the power of the home appliance 100 is turned on, the controller 140 controls the operation of the washing unit 150 based on the operation command received from the voice recognizer 130 (S180).

At this time, the controller 140 may determine whether the state of the door 153 is changed from the open state to the close state after the power of the home appliance 100 is turned on with reference to the history of door stored in the memory 190.

Scenario 4 (S4) corresponds to a case in which the state of the door 153 maintains the close state after the power of the home appliance 100 is turned on. Therefore, in Scenario 4 (S4), as there is a high probability that the user may not identify the inside of the washing unit 150 during insertion of laundry into the washing unit, the controller 140 may not execute the operation command through the voice of the user.

Then, the controller 140 generates a guidance message to request identification of the washing unit 150 (S290).

Then, the controller 140 may transmit the generated guidance message to the TTS 135. The guidance message converted into the voice data by the TTS 135 may be output from the voice guidance 120 through sound.

Then, after the guidance message is output from the voice guidance 120, the door 153 may be opened and closed by the user (S295). This indicates that the user who recognized the guidance message identified the inside of the washing unit 150. In this case, as the user identifies the inside of the washing unit 150, the possibility that safety accidents occur is lowered.

Then, the controller 140 may control the operation of the washing unit 150 based on the operation command received from the voice recognizer 130 (S280).

On the other hand, if there is no change of the state of the door 153 after the guidance message is output from the voice guidance 120, the controller 140 may not execute the operation command through the voice of the user.

Meanwhile, in S220, if the current state of the door 153 is a close state, the controller 140 senses whether the user has opened the door 153 (S230). The controller 140 may sense the state of the door 153 through the sensor 160.

A case in which a current state of the door 153 is the close state and the user switches the door 153 into the open state is defined as 'Scenario 5' (S5). Further, a case in which the current state of the door 153 is in the close state and the user maintains the door 153 to be in the close state is defined as 'Scenario 6 (S6)'. Hereinafter, Scenario 5 (S5) and Scenario 6 (S6) will be described.

In the case of Scenario 5 (S5), the door 153 is switched from the close state to the open state by the user.

At this time, the controller 140 automatically turns on the power of the home appliance 100 (S252). The fact that the user has opened the door 153 indicates that there is intent to use the home appliance 100.

Subsequently, the user inserts the laundry into the washing unit 150 (S254).

Subsequently, the user finishes the insertion of the laundry into the washing unit 150 and closes the door 153 (S256).

Subsequently, the controller 140 receives an operation command from the user through voice (S260).

Subsequently, the controller 140 checks the history of door after the power of the home appliance 100 is turned on (S170).

Scenario 5 (S5) corresponds to a case in which the state of the door 153 is changed from the open state to the close state after the power of the home appliance 100 is automatically turned on. Therefore, in Scenario 5 (S5), there is a probability that the user may identify the inside of the washing unit 150 during insertion of laundry into the washing unit 150, the controller 140 may execute the operation command through the voice of the user.

On the other hand, in Scenario 6 (S6), the user turns on the power of the home appliance 100 without changing the state of the door 153 (S246).

Then, the controller 140 receives an operation command from the user through voice (S260).

Then, the controller 140 checks the history of door after the power of the home appliance 100 is turned on (S270). At this time, the door 153 maintains the close state continuously after the power of the home appliance 100 is turned on.

In the case of Scenario 6 (S6), the controller 140 generates a guidance message requesting identification of the washing unit 150 (S290) because the user does not identify the inside of the washing unit 150 and there is a risk of the safety accidents. In this case, the controller 140 may not operate the washing unit 150 based on the operation command.

Then, the controller 140 may transmit the generated guidance message to the TTS 135. Then, the guidance message converted into voice data by the TTS 135 may be output from the voice guidance 120 through voice.

Subsequently, after the guidance message is output from the voice guidance 120, the door 153 may be switched from the open state to the close state by the user (S295). This indicates that the user who recognized the guidance message identified the inside of the washing unit 150.

Then, the controller 140 may control the operation of the washing unit 150 based on the operation command received from the voice recognizer 130 (S280).

On the other hand, if there is no change of the state of the door 153 after the guidance message is output from the voice guidance 120, the controller 140 may not execute the operation command through the voice of the user.

In summary, in the method for controlling the home appliance according to another implementation of the present disclosure, only when the probability of occurrence of the safety accidents during operation of the home appliance 100 is low, the controller 140 may operate the washing unit 150 based on the voice command of the user.

Accordingly, the user may control the home appliance to start the operation thereof through voice. Therefore, the present disclosure may enable eliminating the inconvenience of pressing the button to start the operation provided in the product in order to start the operation of the home appliance. Further, the reliability of the home appliance with respect to the safety may be improved.

While the present disclosure has been mainly described with reference to the implementation of the present disclosure hereinabove, various modifications and changes can be made at the level of those skilled in the art. Therefore, unless such a modification and change do not deviate the scope of the present disclosure, it will understand that they are included in the scope of the present disclosure.

| [Description of Reference Numerals] | |
|---|---|
| 100: Home appliance | 110: Voice input |
| 120: Voice guidance | 130: Voice recognizer |
| 131: ASR | 133: NLP |
| 135: TTS | 140: Controller |
| 150: Washing unit | 160: Sensor |
| 170: Communicator | 180: Interface |
| 190: Memory | 195: Power supply |
| 200: Voice recognition server system | |

What is claimed is:

1. An apparatus, comprising:
   at least one microphone configured to receive a voice from a user;
   a voice recognizer configured to identify an operation command based on the voice received by the at least one microphone;
   a washing unit configured to wash laundry;
   a sensor configured to sense a state of a door coupled to the washing unit;
   a power supply that provides power to components of the apparatus; and
   a processor configured to:
   control the power supply so that the power of the apparatus is turned on when the state of the door changes from the closed state to the open state while the power of the apparatus is turned off, and
   control operation of the washing unit according to the operation command, when the door is changed from an open state to a close state after power of the appliance is turned on.

2. The apparatus of claim 1, wherein the processor is further configured to:
   generate a guidance message to request a check of the washing unit, when the sensed state of the door is maintained in the closed state after the apparatus has been turned on.

3. The apparatus of claim 2, wherein the voice recognizer comprises:
   a natural language recognizer configured to convert the voice received by the at least one microphone into text;
   an intent analyzer configured to extract the operation command from the text, and
   a text-to-speech element configured to convert the guidance message into voice data.

4. The apparatus of claim 3, further comprising:
a voice guidance configured to convert the voice data into sound and output the sound; and
wherein the processor is configured to perform the control the operation of the washing unit based on the operation command when the door is changed from the open state to the close state after the sound is output.

5. The apparatus of claim 1, wherein the power supply provides the processor with at least a minimum power to turn on the power.

6. The apparatus of claim 1, further comprising a memory configured to store data sensed by the sensor.

7. The apparatus of claim 6, wherein the data stored in the memory is initialized when the power of the apparatus is turned off.

8. A method for controlling an apparatus, the method comprising
receiving a voice from a user;
identifying an operation command based on the received voice;
identifying history of a door coupled to a washing unit of the apparatus, wherein the history comprises occurrences of an open state and a closed state of the door;
turning on a power of the apparatus when a state of the door changes from the closed state to the open state while the power of the apparatus is turned off; and
controlling operation of the washing unit according to the operation command, based upon the history of the door indicating that a state of the door has changed from the open state to the closed state after turning on the apparatus.

9. The method of claim 8, further comprising:
generating a guidance message to request a check of the washing unit, when the state of the door is maintained in the closed state after the apparatus has been turned on.

10. The method of claim 9, further comprising:
performing the controlling operation of the washing unit according to the operation command after the generated guidance message is outputting.

11. The method of claim 8, further comprising:
storing, in a memory, the history of the door.

12. The method of claim 11, further comprising:
initializing the history of door when the power of the apparatus is turned off.

13. An apparatus, comprising:
a washing unit configured to wash laundry;
a sensor configured to sense a state of a door coupled to the washing unit;
a power supply that provides power to components of the apparatus; and
a processor configured to:
receive information related to a voice of a user;
identify an operation command based on the information;
control the power supply so that the power of the apparatus is turned on when a state of the door changes from the closed state to the open state while the power of the apparatus is turned off; and
control operation of the washing unit according to the operation command, when the door is changed from an open state to a close state after power of the appliance is turned on.

14. The apparatus of claim 13, wherein the processor is further configured to:
generate a guidance message to request a check of the washing unit, when the sensed state of the door is maintained in the closed state after the apparatus has been turned on.

15. The apparatus of claim 14, wherein the processor is further configured to:
convert the information related to the voice into text;
extract the operation command from the text; and
convert the guidance message into voice data.

16. The apparatus of claim 15, wherein the processor is further configured to:
convert the voice data into sound and cause output of the sound;
perform the control the operation of the washing unit according to the operation command after the sound is output.

17. The apparatus of claim 16, further comprising:
a memory configured to store data sensed by the sensor.

* * * * *